United States Patent
Okada

(10) Patent No.: US 9,995,199 B2
(45) Date of Patent: Jun. 12, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Yoshihiro Okada, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 131 days.

(21) Appl. No.: 14/964,899

(22) Filed: Dec. 10, 2015

(65) Prior Publication Data
US 2016/0169161 A1 Jun. 16, 2016

(30) Foreign Application Priority Data

Dec. 12, 2014 (JP) ................................. 2014-252403

(51) Int. Cl.
*F02M 63/00* (2006.01)
*F01P 7/14* (2006.01)
(Continued)

(52) U.S. Cl.
CPC ........ *F01P 7/14* (2013.01); *F01P 3/20* (2013.01); *F01P 7/165* (2013.01); *F01P 7/167* (2013.01); *F02B 29/0412* (2013.01); *F02B 29/0443* (2013.01); *F02B 29/0493* (2013.01); *F02M 26/04* (2016.02); *F02M 26/32* (2016.02); *F01P 2060/02* (2013.01); *F01P 2060/12* (2013.01); *F02M 21/0248* (2013.01);
(Continued)

(58) Field of Classification Search
CPC .. F01P 2007/146; F01P 2025/32; F01P 7/164; F01P 7/165
USPC ....................................................... 123/41.02
See application file for complete search history.

(56) References Cited

U.S. PATENT DOCUMENTS

| | | | | |
|---|---|---|---|---|
| 5,394,854 A * | 3/1995 | Edmaier | ................ | F01P 7/165 123/542 |
| 2003/0098011 A1* | 5/2003 | Natkin | ................ | F01P 9/06 123/339.17 |

(Continued)

FOREIGN PATENT DOCUMENTS

| | | |
|---|---|---|
| JP | 2001-248448 A | 9/2001 |
| JP | 2010-249129 A | 11/2010 |

(Continued)

*Primary Examiner* — Jacob Amick
*Assistant Examiner* — Charles Brauch
(74) *Attorney, Agent, or Firm* — Hunton Andrews Kurth LLP

(57) ABSTRACT

An internal combustion engine has a water-cooled intercooler cooling intake air turbocharged by a turbocharger. The intercooler has an HT intercooler into which HT cooling water passing through a cylinder block is introduced and an LT intercooler into which LT cooling water lower in temperature than the HT cooling water is introduced and the LT intercooler is arranged to abut against an intake downstream side of the HT intercooler. A target LT temperature is set to a high temperature-side target value in a case where a temperature of the HT cooling water flowing into the HT intercooler is lower than a target HT temperature correlated with warm-up completion and the target LT temperature is set to a low temperature-side target value in a case where the temperature of the HT cooling water is equal to or higher than the target HT temperature.

7 Claims, 5 Drawing Sheets

(51) Int. Cl.
*F01P 3/20* (2006.01)
*F01P 7/16* (2006.01)
*F02B 29/04* (2006.01)
*F02M 26/04* (2016.01)
*F02M 26/32* (2016.01)
*F02M 51/06* (2006.01)
*F02M 61/18* (2006.01)
*F02M 21/02* (2006.01)
*F02M 21/04* (2006.01)

(52) U.S. Cl.
CPC ........... *F02M 21/04* (2013.01); *F02M 51/061* (2013.01); *F02M 61/18* (2013.01); *F02M 63/0015* (2013.01); *Y02T 10/146* (2013.01)

(56) References Cited

U.S. PATENT DOCUMENTS

| | | | |
|---|---|---|---|
| 2007/0204984 A1* | 9/2007 | Limbeck | H01M 8/04029 165/202 |
| 2009/0050117 A1* | 2/2009 | Tai | F02B 29/0412 123/542 |
| 2010/0044606 A1* | 2/2010 | Moench | F16K 11/074 251/129.11 |
| 2013/0055990 A1* | 3/2013 | Kamada | F02D 15/00 123/48 R |

FOREIGN PATENT DOCUMENTS

| | | |
|---|---|---|
| JP | 2013-514489 A | 4/2013 |
| WO | 2011/073512 A1 | 6/2011 |

* cited by examiner

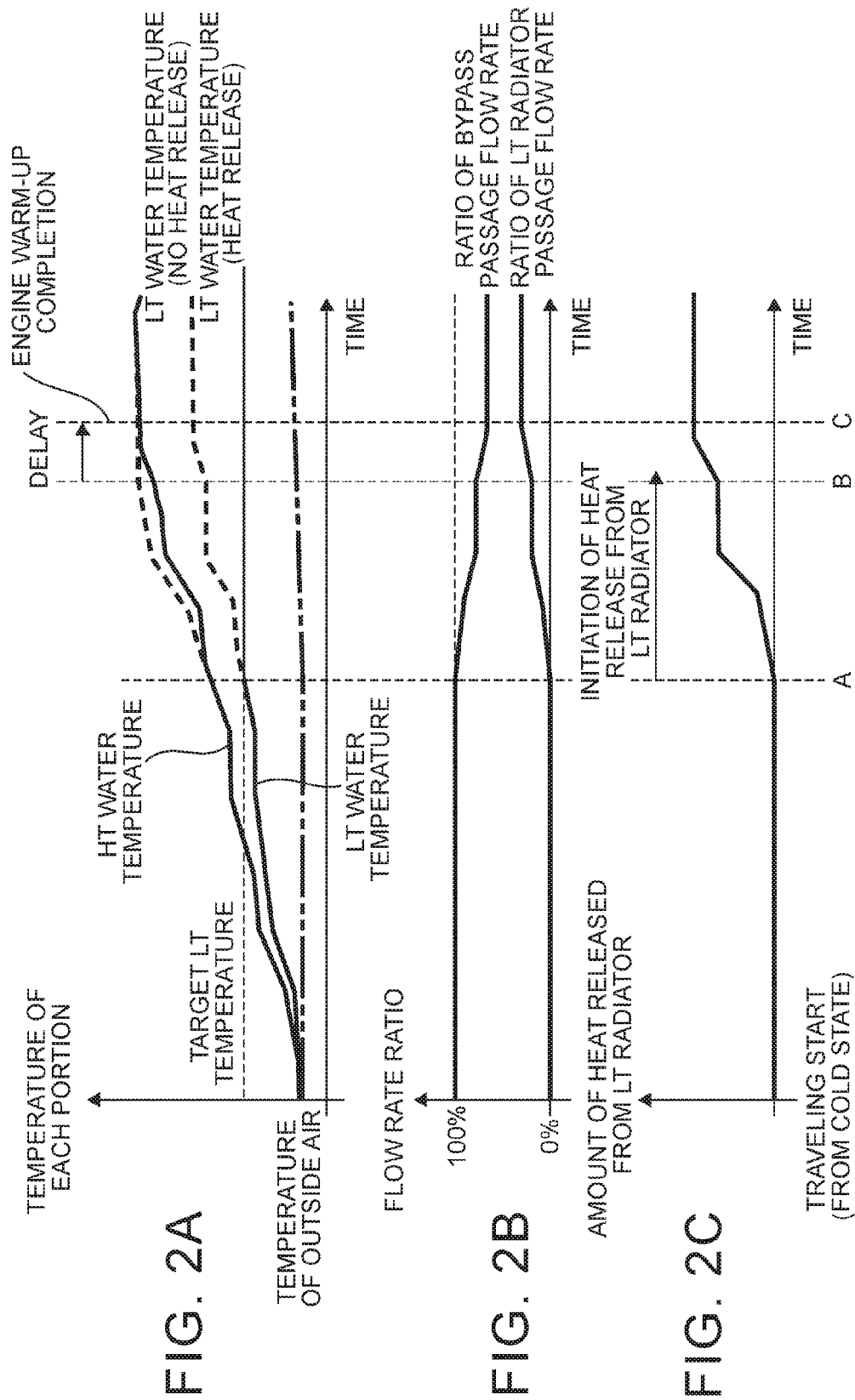

CONTROL DEVICE FOR INTERNAL COMBUSTION ENGINE

INCORPORATION BY REFERENCE

The disclosure of Japanese Patent Application No. 2014-252403 filed on Dec. 12, 2014 including the specification, drawings and abstract is incorporated herein by reference in its entirety.

BACKGROUND OF THE INVENTION

1. Field of the Invention

The invention relates to a control device for an internal combustion engine.

2. Description of Related Art

In Japanese Patent Application Publication No. 2001-248448, for example, an intake air cooling device that cools supplied air in two stages by using two cooling cores through which cooling water flows is disclosed. In this device, a first stage cooling core on an air supply upstream side on which a high cooling water temperature is set and a second stage cooling core on an air supply downstream side on which a low cooling water temperature is set form an integral combination built into an air supply manifold. According to this configuration, cooling water in a cylinder block is used as high-temperature water of the first stage cooling core, and thus a heat recovery amount increases and total efficiency is improved. In addition, the second stage cooling core, which is close to an air supply port, can cool blowback gas from a combustion chamber, and thus the occurrence of knocking is suppressed.

In a cooling device that has a configuration in which a high-temperature intercooler (hereinafter, referred to as an "HT intercooler") through which high-temperature cooling water passing through a cylinder block flows and a low-temperature intercooler (hereinafter, referred to as an "LT intercooler") through which cooling water adjusted to a low temperature by radiation flows abut against each other as in the related art described above, heat is transferred from the HT intercooler to the LT intercooler. Accordingly, the amount of heat transported from the HT intercooler to the LT intercooler might increase and the length of time required for engine warm-up might increase when, for example, radiation from the cooling water circulating through the LT intercooler to the atmosphere is performed during the warm-up of the internal combustion engine.

SUMMARY OF THE INVENTION

An object of the invention is to provide a control device that is capable of shortening the length of time which is required for internal combustion engine warm-up in an internal combustion engine provided with a water-cooled intercooler cooling intake air turbocharged by a turbocharger.

According to a first aspect of the invention, there is provided a control device for an internal combustion engine having a water-cooled intercooler cooling intake air turbocharged by a turbocharger, the intercooler having a high-temperature intercooler into which high-temperature cooling water passing through a cylinder block of the internal combustion engine is introduced and a low-temperature intercooler into which low-temperature cooling water lower in temperature than the high-temperature cooling water introduced into the high-temperature intercooler is introduced, the low-temperature intercooler being arranged to abut against an intake downstream side of the high-temperature intercooler, the control device including a temperature adjusting portion configure to adjust a temperature of the low-temperature cooling water by radiation and a controller configured to control the temperature adjusting portion such that the temperature of the low-temperature cooling water flowing into the low-temperature intercooler is allowed to become higher than a first target low temperature in a case where a temperature of the high-temperature cooling water flowing into the high-temperature intercooler is lower than a target high temperature and the temperature of the low-temperature cooling water reaches the first target low temperature in a case where the temperature of the high-temperature cooling water is equal to or higher than the target high temperature.

In the first aspect described above, the target high temperature may be the temperature of the high-temperature cooling water in a case where warm-up of the internal combustion engine is completed.

In the first aspect described above, the controller may set a target low temperature of the low-temperature cooling water flowing into the low-temperature intercooler. The controller may control the temperature adjusting portion such that the temperature of the low-temperature cooling water reaches the target low temperature. The controller may set the target low temperature to a second target low temperature higher than the first target low temperature in a case where the temperature of the high-temperature cooling water flowing into the high-temperature intercooler is lower than the target high temperature and may set the target low temperature to the first target low temperature in a case where the temperature of the high-temperature cooling water is equal to or higher than the target high temperature.

In the first aspect described above, the temperature adjusting portion may have a low-temperature cooling water circuit configured to circulate the low-temperature cooling water between the low-temperature intercooler and a radiator, a bypass flow path configured to bypass the radiator from the low-temperature cooling water circuit, and a flow rate adjusting portion configured to adjust a flow rate of the low-temperature cooling water bypassing from the low-temperature cooling water circuit to the bypass flow path.

The first aspect described above may further include an EGR device configured to introduce exhaust gas to an intake upstream side of the turbocharger and the controller controls an EGR rate of the EGR device such that a dew point of the intake air passing through the low-temperature intercooler becomes equal to or lower than the first target low temperature.

In the aspect described above, the controller may control the temperature adjusting portion such that the temperature of the low-temperature cooling water flowing into the low-temperature intercooler reaches the first target low temperature in a case where the temperature of the high-temperature cooling water flowing into the high-temperature intercooler is lower than the target high temperature and an operation condition determined from an engine load and an engine rotational speed of the internal combustion engine belongs to a predetermined high load region.

In the first aspect described above, the controller controls the temperature adjusting portion such that the temperature of the low-temperature cooling water flowing into the low-temperature intercooler reaches the first target low temperature in a case where the temperature of the high-temperature cooling water flowing into the high-temperature intercooler is lower than the target high temperature and a knocking region employment ratio is higher than a predetermined ratio.

According to a second aspect of the invention, there is provided a control device for an internal combustion engine having a water-cooled intercooler cooling intake air turbocharged by a turbocharger, the intercooler having a high-temperature intercooler into which high-temperature cooling water passing through a cylinder block of the internal combustion engine is introduced and a low-temperature intercooler into which low-temperature cooling water lower in temperature than the high-temperature cooling water introduced into the high-temperature intercooler is introduced, the low-temperature intercooler being arranged to abut against an intake downstream side of the high-temperature intercooler, the control device including a low-temperature cooling water circuit configured to circulate the low-temperature cooling water between the low-temperature intercooler and a radiator, a bypass flow path configured to bypass the radiator from the low-temperature cooling water circuit, an adjusting portion configured to adjust a flow rate ratio of the low-temperature cooling water bypassing from the low-temperature cooling water circuit to the bypass flow path, and a controller configured to control the adjusting portion such that the flow rate ratio is maximized in a case where a temperature of the high-temperature cooling water flowing into the high-temperature intercooler is lower than a target high temperature.

In the second aspect described above, the controller may control the adjusting portion such that a temperature of the low-temperature cooling water flowing into the low-temperature intercooler reaches a target low temperature in a case where the temperature of the high-temperature cooling water flowing into the high-temperature intercooler is equal to or higher than the target high temperature.

In the second aspect described above, the target high temperature may be the temperature of the cooling water in a case where warm-up of the internal combustion engine is completed.

The second aspect described above may further include an EGR device configured to introduce exhaust gas to an intake upstream side of the turbocharger and the controller controls an EGR rate of the EGR device such that a dew point of the intake air passing through the low-temperature intercooler becomes equal to or lower than the target low temperature.

According to the first aspect, the amount of the radiation from the low-temperature cooling water can be decreased in a period when the temperature of the high-temperature cooling water is lower than the target high temperature, and thus the amount of heat transfer from the low-temperature intercooler to the high-temperature intercooler in that period can be decreased. Accordingly, the length of time required for the temperature of the high-temperature cooling water to reach the target high temperature can be shortened according to the invention.

According to the second aspect, the amount of the radiation from the low-temperature cooling water can be decreased in a period until the completion of the warm-up of the internal combustion engine, and thus the amount of heat transfer from the low-temperature intercooler to the high-temperature intercooler prior to the warm-up can be decreased according to the invention. Accordingly, the length of time required for the completion of the warm-up can be shortened.

According to a third aspect, the temperature of the low-temperature cooling water is adjusted to the first target low temperature in a case where the temperature of the high-temperature cooling water is lower than the target high temperature and the temperature of the low-temperature cooling water is adjusted to the second target low temperature higher than the first target low temperature in a case where the temperature of the high-temperature cooling water is equal to or higher than the target high temperature. Accordingly, the amount of the radiation from the low-temperature cooling water can be decreased in a period until the temperature of the high-temperature cooling water reaching the target high temperature according to the invention, and thus the amount of the heat transfer from the low-temperature intercooler to the high-temperature intercooler in that period can be decreased. Accordingly, the length of the time required for the temperature of the high-temperature cooling water to reach the target high temperature can be shortened.

According to a fourth aspect, the flow rate of the low-temperature cooling water bypassing the radiator can be adjusted when the flow rate adjusting portion is adjusted. Accordingly, the temperature of the low-temperature cooling water can be efficiently controlled.

According to a fifth aspect, the EGR rate is controlled such that the dew point of the intake air passing through the low-temperature intercooler becomes equal to or lower than the target low temperature. Accordingly, suctioning of the dew condensation water into the internal combustion engine can be suppressed according to the invention.

According to a sixth aspect, the temperature of the low-temperature cooling water is inhibited from exceeding the first target low temperature in a case where the operation condition of the internal combustion engine belongs to the predetermined high load region. Accordingly, occurrence of knocking can be effectively suppressed.

According to a seventh aspect, the temperature of the low-temperature cooling water is inhibited from exceeding the first target low temperature in a case where the knocking region employment ratio is higher than the predetermined ratio. Accordingly, the occurrence of the knocking can be effectively suppressed.

According to the second aspect, the ratio of the flow rate bypassing the radiator from the low-temperature cooling water circuit is adjusted to be maximized in a case where the temperature of the high-temperature cooling water is lower than the target high temperature. Accordingly, the amount of the radiation from the low-temperature cooling water can be minimized in a case where the temperature of the high-temperature cooling water is lower than the target high temperature according to the invention, and thus the amount of the heat transfer from the low-temperature intercooler to the high-temperature intercooler can be decreased. Accordingly, the length of the time required for the temperature of the high-temperature cooling water to reach the target high temperature can be shortened.

According to a ninth aspect, the temperature of the low-temperature cooling water can be controlled at the target low temperature in a case where the temperature of the high-temperature cooling water reaches the target high temperature.

According to a tenth aspect, the amount of the radiation from the low-temperature cooling water can be decreased in the period until the completion of the warm-up of the internal combustion engine, and thus the amount of the heat transfer from the low-temperature intercooler to the high-temperature intercooler prior to the warm-up can be decreased according to the invention. Accordingly, the length of the time required for the completion of the warm-up can be shortened.

According to an eleventh aspect, the EGR rate is controlled such that the dew point of the intake air passing through the low-temperature intercooler becomes equal to or lower than the target low temperature. Accordingly, the suctioning of the dew condensation water into the internal combustion engine can be suppressed according to the invention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is one of time charts illustrating changes in various state quantities during a cold start of an internal combustion engine;

FIG. 2B is one of time charts illustrating changes in various state quantities during a cold start of an internal combustion engine;

FIG. 2C is one of time charts illustrating changes in various state quantities during a cold start of an internal combustion engine;

DETAILED DESCRIPTION OF EMBODIMENTS

First Embodiment

A first embodiment of the invention will be described with reference to accompanying drawings.

[Configuration of First Embodiment]

Figure 1:
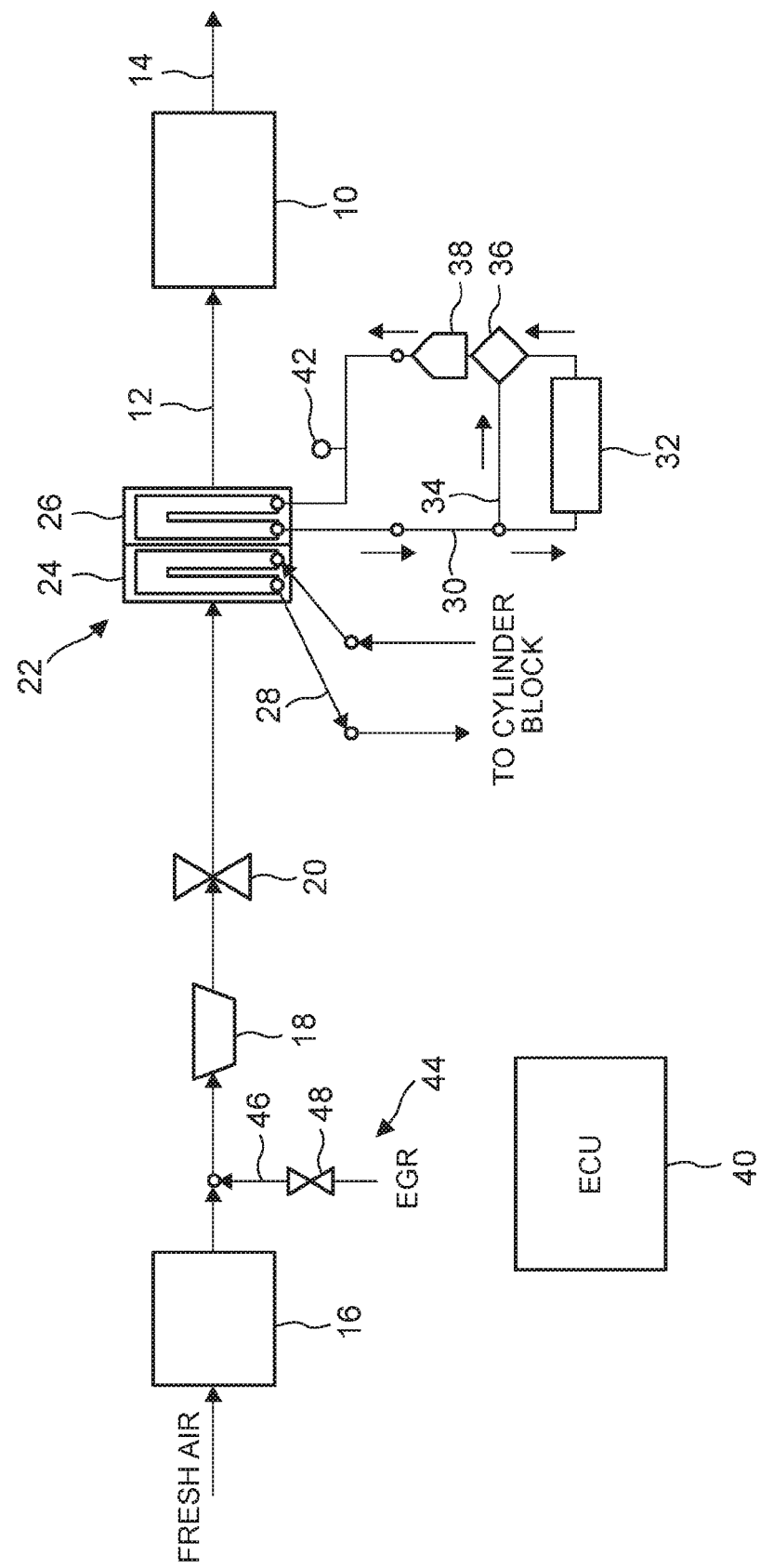
FIG. 1 is a diagram illustrating a system configuration of a control device according to this embodiment.

FIG. 1 is a diagram illustrating a system configuration of a control device according to this embodiment. The control device according to this embodiment is provided with an internal combustion engine 10. The internal combustion engine 10 is configured as a four-cycle reciprocating engine that is provided with a turbocharger. An intake passage 12 and an exhaust passage 14 communicate with each cylinder of the internal combustion engine 10. In the intake passage 12, a compressor 18 of the turbocharger is arranged on the downstream side of an air cleaner 16. The turbocharger is provided with a turbine (not illustrated), which is operated by the exhaust energy of exhaust gas, in the exhaust passage 14. The compressor 18 is integrally connected to the turbine via a connecting shaft and is driven to rotate based on the exhaust energy of the exhaust gas input to the turbine.

In the intake passage 12, a throttle 20 is arranged on the downstream side of the compressor 18. In the intake passage 12, a water-cooled intercooler 22 for cooling intake air that is turbocharged by the compressor 18 of the turbocharger is arranged on the downstream side of the throttle 20. The intercooler 22 is configured as a unit that has a two-system cooling system, one being an HT intercooler 24 and the other being an LT intercooler 26. High-temperature cooling water passing through a cylinder block of the internal combustion engine 10 (hereinafter, referred to as "HT cooling water") is introduced into the HT intercooler 24 and low-temperature cooling water lower in temperature than the HT cooling water (hereinafter, referred to as "LT cooling water") is introduced into the LT intercooler 26. The LT intercooler 26 is arranged on the intake downstream side of the HT intercooler 24. The HT intercooler 24 and the LT intercooler 26 abut against each other.

An HT cooling water circuit 28 is connected to the HT intercooler 24. The HT cooling water that is guided out of the cylinder block of the internal combustion engine 10 flows through the HT cooling water circuit 28. A HT water temperature adjusting portion (not illustrated) for adjusting the temperature of the HT cooling water that flows into the HT intercooler 24 (hereinafter, referred to as "HT water temperature") by radiation is disposed in the HT cooling water circuit 28.

An LT cooling water circuit 30 for circulating the LT cooling water is connected to the LT intercooler 26. An LT radiator 32 for radiating heat from the LT cooling water is disposed in the middle of the LT cooling water circuit 30. A bypass flow path 34 bypassing the LT radiator 32 is disposed in the LT cooling water circuit 30, and a mixing valve 36 is disposed in a merging portion of the bypass flow path 34 and the LT cooling water circuit 30. The mixing valve 36 is configured as a valve that is capable of adjusting the ratio between the flow rate of the LT cooling water passing through the bypass flow path (hereinafter, referred to as a "bypass passage flow rate") and the flow rate of the LT cooling water passing through the LT radiator 32 (hereinafter, referred to as an "LT radiator passage flow rate"). In the LT cooling water circuit 30, an electric water pump (EWP) 38 is arranged on the downstream side of the mixing valve 36. A temperature sensor 42 for detecting the temperature of the LT cooling water flowing into the LT intercooler 26 (hereinafter, referred to as an "LT water temperature") is arranged on the downstream side of the EWP 38.

In addition, the system according to this embodiment is provided with an EGR device 44. An EGR passage 46 that connects the upstream side of the compressor 18 in the intake passage 12 to the downstream side of the turbine in the exhaust passage 14 and an EGR valve 48 for adjusting the degree of opening of the EGR passage 46 constitute the EGR device 44.

In addition, the system according to this embodiment is provided with an electronic control unit (ECU) 40 as a controller. The ECU 40 is provided with at least an I/O interface, a memory, and a central processing unit (CPU). The I/O interface is disposed in order to receive sensor signals from various sensors that are attached to the internal combustion engine 10 or a vehicle in which the internal combustion engine 10 is mounted and output operation signals to various actuators of the internal combustion engine 10. Examples of the sensors that send the signals to the ECU 40 include various sensors for acquiring engine operation states, such as a crank angle sensor for acquiring a rotational position of a crankshaft and an engine rotational speed, in addition to the temperature sensor 42 described above. Examples of the actuators as the destinations of the operation signals from the ECU 40 include various actuators for controlling an engine operation, such as a fuel injection valve for supplying fuel into a combustion chamber of each cylinder and an ignition device for igniting an air-fuel mixture in each combustion chamber, in addition to the mixing valve 36 and the EGR valve 48 described above. Various control programs, maps, and the like for controlling the internal combustion engine 10 are stored in the memory. The CPU executes the control programs and the like after reading the control programs and the like from the memory and generates the operation signals for the various actuators based on the received sensor signals.

[Operation of First Embodiment]

Hereinafter, an operation of the first embodiment will be described. In the system according to this embodiment, the ECU 40 performs intake air temperature control by using the intercooler 22. More specifically, the ECU 40 adjusts the degree of opening of the mixing valve 36 so that the LT water temperature which is detected by the temperature sensor 42 reaches a target low temperature as a target value (hereinafter, referred to as a target LT temperature, examples of which include 35° C.). In addition, the HT water temperature adjusting portion adjusts the HT water temperature so that the HT water temperature reaches a target high temperature as a target value (hereinafter, referred to as a target HT temperature). The target HT temperature is a temperature at which engine warm-up is completed. The target HT temperature is set to, for example, 80° C.

The intake air that is turbocharged by the compressor 18 is cooled to the target HT temperature by the HT intercooler 24. The intake air is introduced into the LT intercooler 26 after passing through the HT intercooler 24. The ECU 40 controls an output of the EWP 38 so that the intake air passing through the LT intercooler 26 is cooled to the target LT temperature. As described above, the turbocharged high-temperature intake air can be efficiently cooled to the target LT temperature by the intake air temperature control.

However, the length of time that is required for the completion of the engine warm-up might increase when the intake air temperature control described above is executed during a cold start of the internal combustion engine 10. FIG. 2 is a time chart illustrating changes in various state quantities during the cold start of the internal combustion engine. FIG. 2A shows changes in the LT water temperature and the HT water temperature, FIG. 2B shows a change in the flow rate ratio between the bypass passage flow rate and the LT radiator passage flow rate, and FIG. 2C shows a change in the amount of radiation from the LT radiator 32.

As illustrated in the drawing, the HT water temperature gradually rises due to heat generated in the internal combustion engine when the internal combustion engine 10 is started in a state where the HT water temperature and the LT water temperature are equal to the temperature of outside air. The LT water temperature rises more gently than the HT water temperature by receiving the heat that is transported from the HT intercooler 24 which abuts against the LT intercooler 26 and the heat that is transported by the intake air. In a case where the LT water temperature is lower than the target LT temperature, the radiation from the LT radiator 32 is not performed because the ratio of the bypass passage flow rate is controlled at 100%.

The point in time A in the time charts of FIGS. 2A, 2B, and 2C represents a point in time when the LT water temperature reaches the target LT temperature. After the point in time A, the ratio of the bypass passage flow rate is decreased by the intake air temperature control so that the LT water temperature reaches the target LT temperature, which results in an increase in the ratio of the LT radiator passage flow rate. In other words, after the point in time A, part of the heat of the LT cooling water is regularly released from the LT radiator 32 so that the LT water temperature does not exceed the target LT temperature.

The dotted lines behind the point in time A in FIGS. 2A, 2B, and 2C show changes in the LT water temperature and the HT water temperature pertaining to the case of no radiation from the LT radiator 32. As illustrated by the dotted lines in the drawing, the rate of increase in the HT water temperature increases when the LT water temperature rises above the target LT temperature. The amount of heat transfer from the HT intercooler 24 to the LT intercooler 26 increases as the temperature difference between the HT water temperature and the LT water temperature increases. Accordingly, when the radiation from the LT radiator 32 is performed in a period prior to the completion of the engine warm-up, the amount of the heat that moves from the HT cooling water to the LT cooling water increases as a result thereof. This leads to a delay in the completion of the engine warm-up.

Figures 3A, 3B, 3C:
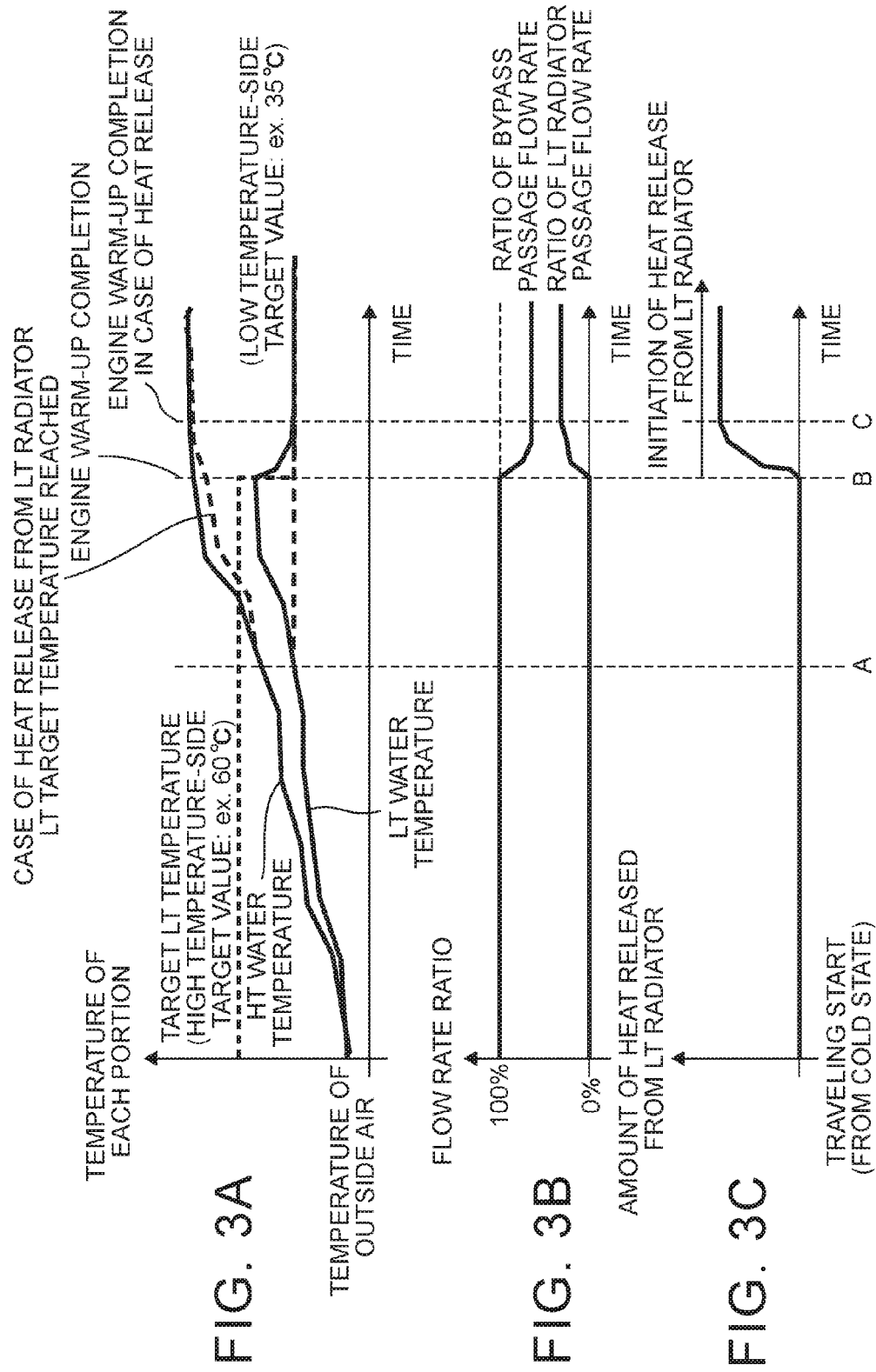
FIG. 3A is one of time charts illustrating changes in the various state quantities during the cold start of the internal combustion engine.
FIG. 3B is one of time charts illustrating changes in the various state quantities during the cold start of the internal combustion engine.
FIG. 3C is one of time charts illustrating changes in the various state quantities during the cold start of the internal combustion engine.

In the system according to this embodiment, the period until the completion of the engine warm-up of the internal combustion engine 10 is controlled so that the radiation from the LT radiator 32 is limited. FIGS. 3A, 3B, and 3C are time charts illustrating changes in the various state quantities during the cold start of the internal combustion engine. FIG. 3A shows changes in the LT water temperature and the HT water temperature, FIG. 3B shows a change in the flow rate ratio between the bypass passage flow rate and the LT radiator passage flow rate, and FIG. 3C shows a change in the amount of radiation from the LT radiator 32.

In the system according to this embodiment, two target values, one being a low temperature-side target value and the other being a high temperature-side target value, are used by switching as the target LT temperature as the target value of the LT water temperature as illustrated in FIGS. 3A, 3B, and 3C. The low temperature-side target value is the target value of the LT water temperature in a state where the engine warm-up is completed, and the high temperature-side target value is a target value that is higher in temperature than the low temperature-side target value. The target LT temperature is set to the high temperature-side target value in the period until the point in time B when the engine warm-up is completed, and the target LT temperature is switched from the high temperature-side target value to the low temperature-side target value at a point in time when the point in time B is reached. According to this control, the LT temperature is allowed to rise above the low temperature-side target value in the period until the point in time B when the engine warm-up is completed. Accordingly, the length of time that is required for the engine warm-up can be effectively shortened.

The low temperature-side target value of the LT water temperature is set to a temperature at which an output performance requirement is satisfied (for example, 35° C.). The high temperature-side target value is set to an upper limit value of the intake air temperature (for example, 60° C.) that is allowable in a state prior to the engine warm-up with knocking characteristics taken into account. Before the completion of the engine warm-up, the temperature of each portion of the engine is low. In this situation, knocking is less likely to occur than after the engine warm-up. Also, knocking is relatively less likely to occur in a situation in which, for example, the temperature of the engine cooling water is reduced after the engine warm-up. However, the effect of a knocking countermeasure on fuel efficiency cannot be ignored depending on the degree of rise in the intake air temperature and the operation state. In the case of a high load request during the engine warm-up, the cooling of the intake air might be more important than the fuel efficiency improvement which can be achieved by the acceleration of the engine warm-up in view of fuel efficiency improvement.

In the system according to this embodiment, the target LT temperature during the engine warm-up is set to the low temperature-side target value in a case where the effect of the fuel efficiency deterioration which is attributable to a rise in the intake air temperature surpasses the effect of the fuel efficiency improvement which can be achieved by the acceleration of the engine warm-up. More specifically, the two types of control described below or the like are executed.

Figure 4:
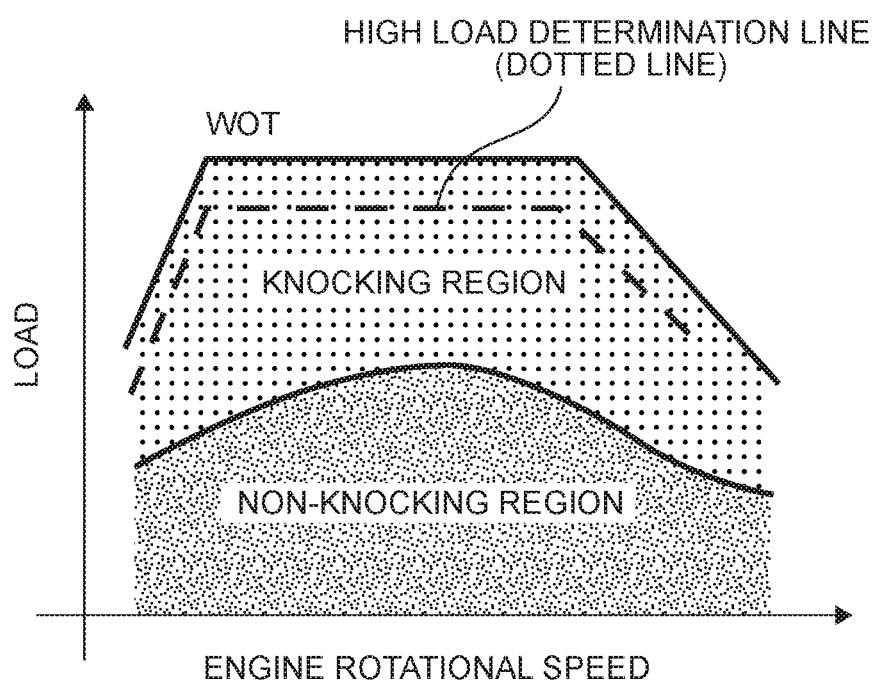
FIG. 4 is an operation region map illustrating a knocking region.

In first control, a knocking region employment ratio regarding the use of an operation region subjected to knocking (hereinafter, referred to as a "knocking region") is calculated by the use of the following Equation (1). FIG. 4 illustrates an operation region map regarding the knocking region. In a case where the calculated knocking region employment ratio exceeds a predetermined ratio, the target LT temperature during the engine warm-up is set to the low temperature-side target value. A value that is set in advance through an experiment or the like as a lower limit value of the knocking region employment ratio pertaining to a case where the effect of the fuel efficiency deterioration attributable to knocking avoidance control such as ignition retarding and an increase in fuel amount surpasses the effect of the fuel efficiency improvement which can be achieved by the acceleration of the engine warm-up can be used as the predetermined ratio.

$$\text{knocking region employment ratio} = \text{knocking region employment time/traveling time} \quad (1)$$

In second control, the target LT temperature during the engine warm-up is set to the low temperature-side target value in a case where the current engine load belongs to a high load region on or above a predetermined high load determination line illustrated in FIG. 4. A value that is set in advance through an experiment or the like as an engine load at which the cooling of the intake air is more important than the fuel efficiency improvement which can be achieved by the acceleration of the engine warm-up in view of fuel efficiency improvement can be used as the predetermined high load determination line.

According to the system of this embodiment, fuel efficiency can be improved by the length of time required for the engine warm-up being shortened as described above.

The ECU 40 functions as EGR control portion controlling an EGR rate by adjusting the EGR device 44. The ECU 40 controls the EGR rate so that the dew point of the intake air containing EGR gas is equal to or lower than the low temperature-side target value. In this manner, the generation of dew condensation water from the intake air introduced into the LT intercooler 26 can be prevented.

Figure 5:
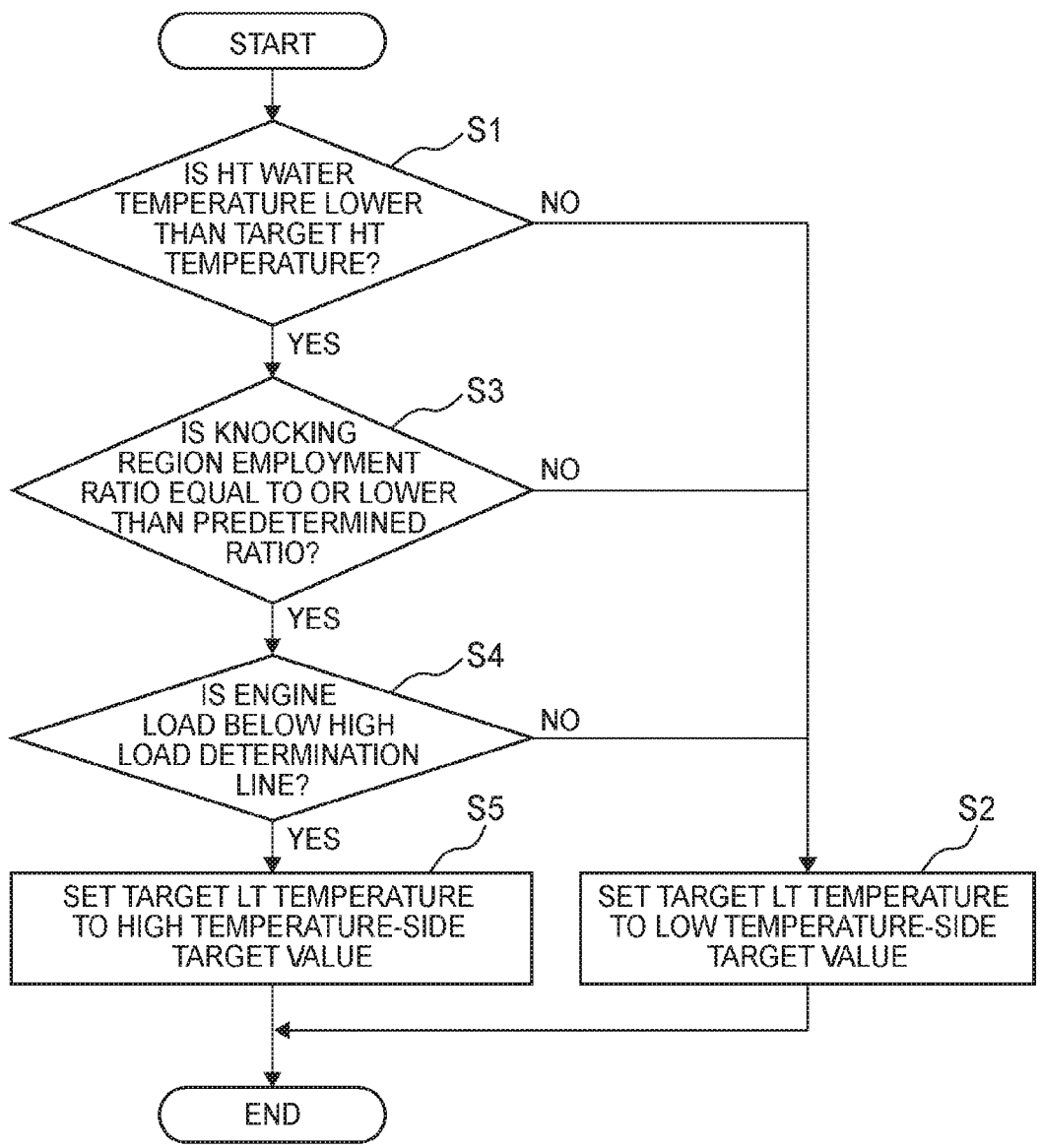
FIG. 5 is a flowchart illustrating a routine for control that is executed according to the first embodiment.

Hereinafter, processing for control that is executed in the system according to this embodiment will be described in detail. FIG. 5 is a flowchart illustrating a routine for control that is executed by the ECU 40 according to the first embodiment. In the first step of this routine, it is determined whether or not the HT water temperature as the temperature of the engine cooling water is lower than the target HT temperature (Step S1). A value that is set in advance as a target value of the HT water temperature for an engine warm-up completion determination is used as the target HT temperature. In a case where the establishment of the target HT temperature being higher than the HT water temperature is not confirmed as a result of the determination, it is determined that the engine warm-up is already completed. In this case, the processing proceeds to the subsequent step, and the target LT temperature is set to the low temperature-side target value (Step S2).

In a case where the establishment of the target HT temperature being higher than the HT water temperature is confirmed in Step S1, it is determined that the engine warm-up has yet to be completed. In this case, the processing proceeds to the subsequent step, and it is determined whether or not the knocking region employment ratio calculated in accordance with the above Equation (1) is equal to or lower than a predetermined ratio (Step S3). In a case where the establishment of the knocking region employment ratio being equal to or lower than the predetermined ratio is not confirmed as a result thereof, it is determined that the effect of the fuel efficiency deterioration attributable to the knocking is significant. Then, the processing proceeds to Step S2, and the target LT temperature is set to the low temperature-side target value.

In a case where the establishment of the knocking region employment ratio being equal to or lower than the predetermined ratio is confirmed in Step S3, it is determined that the effect of the fuel efficiency deterioration attributable to the knocking is insignificant. Then, the processing proceeds to the subsequent step, and it is determined whether or not the current engine load is below a predetermined high load line in the operation region map illustrated in FIG. 4 (Step S4). In a case where it is determined that the current engine load is on or above the predetermined high load line as a result thereof, it is determined that the effect of fuel efficiency deterioration attributable to high load traveling is significant. Then, the processing proceeds to Step S2, and the target LT temperature is set to the low temperature-side target value.

In a case where it is determined in Step S4 that the current engine load is below the predetermined high load line, the processing proceeds to the subsequent step, and the target LT temperature is set to the high temperature-side target value (Step S5).

As described above, the amount of the heat that is released by moving from the HT intercooler 24 to the LT intercooler 26 during the engine warm-up can be decreased according to the system of the first embodiment. Accordingly, the length of time required for the warm-up can be shortened based on the promotion of an increase in the temperature of the HT cooling water.

According to the above description, the system according to the first embodiment is configured to use the LT radiator 32, the bypass flow path 34, and the mixing valve 36 as the temperature adjusting portion configured to adjust the temperature of the LT cooling water by radiation. However, the configuration of the temperature adjusting portion is not limited to the above description, and other known configurations may be adopted instead.

In the system according to the first embodiment described above, a condition determination considering the effect of the fuel efficiency determined from the knocking region employment ratio and the effect of the fuel efficiency determined from the engine load is performed while the target LT temperature is set during the engine warm-up. However, as described above, knocking is less likely to occur and a high load traveling request is less likely to be made during the engine warm-up. In addition, the deterioration of the fuel efficiency can also be reduced by condition setting during the engine warm-up, examples of which include the setting of a low high temperature-side target value and the performing of an output limit with respect to a high load. Accordingly, the above-described condition determination during the engine warm-up is optional.

In the system according to the first embodiment described above, control for switching the target LT temperature from the high temperature-side target value to the low temperature-side target value is performed before and after the engine warm-up. However, another method may take the place insofar as control is performed so that the LT water temperature is allowed to rise above the low temperature-side target value during the engine warm-up. For example, the mixing valve 36 may be controlled so that the ratio of the bypass passage flow rate is adjusted to be maintained or increased in the period prior to the engine warm-up and the ratio of the bypass passage flow rate is adjusted to be decreased after the engine warm-up. In the period prior to the engine warm-up, it is preferable that the ratio of the bypass passage flow rate is adjusted to its maximum (100%).

In the system according to the first embodiment described above, the EGR rate is controlled so that the dew point of the intake air containing the EGR gas becomes equal to or lower than the low temperature-side target value as a countermeasure for preventing the generation of the dew condensation water from the intake air introduced into the LT intercooler 26. However, the countermeasure for preventing the generation of the dew condensation water is not limited to this method. For example, the low temperature-side target value may be set so that the low temperature-side target value becomes higher than the dew point of the intake air containing the EGR gas with the EGR rate fixed at a constant ratio.

In the system according to the embodiment described above, the HT intercooler 24 may correspond to the "high-temperature intercooler" according to the first aspect, the LT intercooler 26 may correspond to the "low-temperature intercooler" according to the first aspect, the HT cooling water may correspond to the "high-temperature cooling water" according to the first aspect, the LT cooling water may correspond to the "low-temperature cooling water" according to the first aspect, the target HT temperature may correspond to the "target high temperature" according to the first aspect, and the target LT temperature may correspond to the "target low temperature" according to the first aspect. In the system according to the embodiment described above, the low temperature-side target value may correspond to the "first target low temperature" according to the first aspect and the LT cooling water circuit 30, the LT radiator 32, the bypass flow path 34, and the mixing valve 36 may correspond to the "temperature adjusting portion" according to the first aspect. In the system according to the embodiment described above, the "controller" according to the first aspect is realized by the ECU 40 executing the processing of Steps in the flowchart as shown in FIG. 5.

In the system according to the embodiment described above, the high temperature-side target value may correspond to the "second target low temperature" according to the third aspect.

In the system according to the embodiment described above, the mixing valve 36 corresponds to the "flow rate adjusting portion" according to the fourth aspect.

In the system according to the embodiment described above, the mixing valve 36 corresponds to the "adjusting portion" according to the eighth aspect. In the system according to the embodiment described above, the "controller" according to the eighth aspect is realized by the ECU 40 executing the processing of Steps in the flowchart as shown in FIG. 5.

What is claimed is:

1. A control device for an internal combustion engine comprising:
    a water-cooled intercooler cooling intake air turbocharged by a turbocharger, the water-cooled intercooler including a high-temperature intercooler into which high-temperature cooling water passing through a cylinder block of the internal combustion engine is introduced and a low-temperature intercooler into which low-temperature cooling water lower in temperature than the high-temperature cooling water introduced into the high-temperature intercooler is introduced, the low-temperature intercooler being arranged to abut against an intake downstream side of the high-temperature intercooler;
    a temperature adjusting portion configured to adjust a temperature of the low-temperature cooling water by radiation; and
    a controller configured to control the temperature adjusting portion such that the temperature of the low-temperature cooling water flowing into the low-temperature intercooler is allowed to become higher than a target low temperature when a temperature of the high-temperature cooling water flowing into the high-temperature intercooler is lower than a target high temperature and the temperature of the low-temperature cooling water reaches the target low temperature when the temperature of the high-temperature cooling water is equal to or higher than the target high temperature.

2. The control device for an internal combustion engine according to claim 1, wherein
    the target high temperature is the temperature of the high-temperature cooling water when warm-up of the internal combustion engine is completed.

3. The control device for an internal combustion engine according to claim 1, wherein
    the controller sets the target low temperature of the low-temperature cooling water flowing into the low-temperature intercooler and controls the temperature adjusting portion such that the temperature of the low-temperature cooling water reaches the target low temperature, and
    wherein the controller sets the target low temperature to a second target low temperature higher than the target low temperature when the temperature of the high-temperature cooling water flowing into the high-temperature intercooler is lower than the target high temperature and sets the target low temperature to the target low temperature when the temperature of the high-temperature cooling water is equal to or higher than the target high temperature.

4. The control device for an internal combustion engine according to claim 1, wherein
    the temperature adjusting portion includes:
    a low-temperature cooling water circuit configured to circulate the low-temperature cooling water between the low-temperature intercooler and a radiator;
    a bypass flow path configured to bypass the radiator from the low-temperature cooling water circuit; and
    a flow rate adjusting portion configured to adjust a flow rate of the low-temperature cooling water bypassing from the low-temperature cooling water circuit to the bypass flow path.

5. The control device for an internal combustion engine according to claim 1, further comprising:

an EGR device configured to introduce exhaust gas to an intake upstream side of the turbocharger, wherein the controller controls an EGR rate of the EGR device such that a dew point of the intake air passing through the low-temperature intercooler becomes equal to or lower than the target low temperature.

6. The control device for an internal combustion engine according to claim 1, wherein the controller controls the temperature adjusting portion such that the temperature of the low-temperature cooling water flowing into the low-temperature intercooler reaches the target low temperature when the temperature of the high-temperature cooling water flowing into the high-temperature intercooler is lower than the target high temperature and an operation condition determined from an engine load and an engine rotational speed of the internal combustion engine belongs to a predetermined high load region.

7. The control device for an internal combustion engine according to claim 1, wherein the controller controls the temperature adjusting portion such that the temperature of the low-temperature cooling water flowing into the low-temperature intercooler reaches the target low temperature when the temperature of the high-temperature cooling water flowing into the high-temperature intercooler is lower than the target high temperature and a knocking region employment ratio is higher than a predetermined ratio.

* * * * *